United States Patent [19]

Evans et al.

[11] Patent Number: 4,500,265

[45] Date of Patent: Feb. 19, 1985

[54] MAGNETICALLY ACTUATED COMPRESSOR

[75] Inventors: Jack Evans, Baltimore; Philip A. Studer, Silver Spring, both of Md.

[73] Assignee: The United States of America as represented by the Administrator of the National Aeronautics and Space Administration, Washington, D.C.

[21] Appl. No.: 461,724

[22] Filed: Jan. 28, 1983

[51] Int. Cl.³ .................. F04B 17/04; H02K 33/14; F01B 19/00; F25B 9/00
[52] U.S. Cl. .................. 417/417; 417/488; 310/22; 310/35; 62/6; 92/98 R
[58] Field of Search .............. 310/23, 24, 32, 34, 310/35, 22; 417/417, 419, 418, 488; 318/649; 308/10; 62/6; 92/98 R; 60/545

[56] References Cited

U.S. PATENT DOCUMENTS

| | | | |
|---|---|---|---|
| 2,283,886 | 5/1942 | Henkell | 417/418 |
| 2,612,419 | 9/1952 | Reynolds | 92/98 D |
| 2,685,838 | 8/1954 | Weinfurt | 417/340 X |
| 3,220,201 | 11/1965 | Heuchling et al. | 62/6 |
| 3,841,798 | 10/1974 | Rehfeld | 310/34 X |
| 3,991,585 | 11/1976 | Mulder | 62/6 |
| 4,010,621 | 3/1977 | Raetz | 62/6 |
| 4,245,869 | 1/1981 | Scheffer | 308/10 |
| 4,389,849 | 6/1983 | Gasser et al. | 308/10 |

FOREIGN PATENT DOCUMENTS

| | | | |
|---|---|---|---|
| 1396864 | 6/1975 | United Kingdom | 92/98 D |
| 966669 | 3/1981 | U.S.S.R. | 318/649 |

Primary Examiner—Carlton R. Croyle
Assistant Examiner—T. Olds
Attorney, Agent, or Firm—John O. Tresansky; John R. Manning; Ronald F. Sandler

[57] ABSTRACT

A vibration free fluid compressor particularly adapted for Stirling cycle cryogenic refrigeration apparatus comprising a pair of identical opposing ferromagnetic pistons (10, 12) located in a housing (22) and between a gas spring including a sealed volume (52, 54, 60) of a working fluid such as gas under pressure. The gas compresses and expands in accordance with movement of the pistons (10, 12) to generate a compression wave which can be vented out to other apparatus, for example, a displacer unit in a Stirling cycle engine. The pistons (10, 12) are urged outwardly due to the pressure of the gas; however, a fixed electromagnetic coil assembly (56), located in the housing adjacent the pistons, is periodically energized to produce a magnetic field which interlinks the pistons (10, 12) in such a fashion that the pistons are mutually attracted to one another. The mass of the pistons (10, 12) in conjunction with the compressed gas between them form a naturally resonant system which when the pistons are electromagnetically energized, produce an oscillating compression wave in the entrapped fluid medium.

14 Claims, 4 Drawing Figures

MAGNETICALLY ACTUATED COMPRESSOR

ORIGIN OF THE INVENTION

The invention described herein was made by employees of the United States Government and may be manufactured and used by or for the Government for governmental purposes without the payment of any royalties thereon or therefor.

CROSS REFERENCE TO RELATED APPLICATION

This application is related to U.S. Pat. No. 4,389,849 which is assigned to the assignee of this application.

1. Technical Field

The invention relates generally to gas compressors and more particularly to a momentum compensated, electromagnetically driven compressor unit.

2. Background Art

This invention is particularly adapted for use with, but not limited to, Stirling cycle apparatus, such as refrigerators. Known prior art apparatus for implementing the gas compressor utilized in such apparatus comprises piston type pumps fitted with piston rings to restrict the leakage of compressed gas and are generally driven by cranks or other mechanical linkages such as squash plates. More recently, however, the mechanical linkages have been eliminated and replaced by direct linear drives. Additionally, the contacting piston rings have also been eliminated by the use of clearance seals and magnetic suspension of the piston to reduce wear. Such a structure has been shown and described in the above referenced patent.

Notwithstanding the improvements realized in this type of apparatus due to the use of magnetic or gas bearings and linear drive motors, it has been found that the mechanical movement of the parts reacts on the structure on which it is mounted, resulting in vibrational disturbances which are particularly undesirable in certain operational environments, e.g. on board spacecraft.

STATEMENT OF THE INVENTION

Accordingly, it is an object of the present invention to provide an improvement in fluid compressor apparatus.

Another object of the invention is to provide an improved gas compressor which is inherently momentum compensated.

Yet another object is to provide an improved gas compressor for use in space applications.

Still another object is to provide an improved gas compressor capable of operating reliably over a relatively long life time without maintenance.

Still a further object of the invention is to provide an improved gas compressor which minimizes undesirable mechanical disturbances.

These and other objects are achieved in accordance with an electromagnetically driven sealed compressor comprised of a pair of identical mutually opposing magnetizable pistons which confine a pressurized volume of a working fluid and which tend to be pushed apart due to the fluid pressure existing between the pistons. The pistons are magnetically coupled by flux periodically generated by an electrically energized coil whereupon mutually attractive forces are produced therebetween causing the pistons to be drawn together and an oscillating compression wave produced. The compressor further includes non-contacting sensor assemblies for detecting the axial and radial orientation of the pistons. Signals are generated in response to the sensed orientation of the pistons for controlling the magnetic field coupling to the pistons. Such a structure eliminates undesirable operational vibrations due to equal and opposite motions of identical masses, thus providing a structure which is momentum compensated.

The foregoing as well as other objects, features and advantages of the invention will become apparent from the following description taken in conjunction with the accompanying drawings.

DETAILED DESCRIPTION OF THE INVENTION

Figure 1:
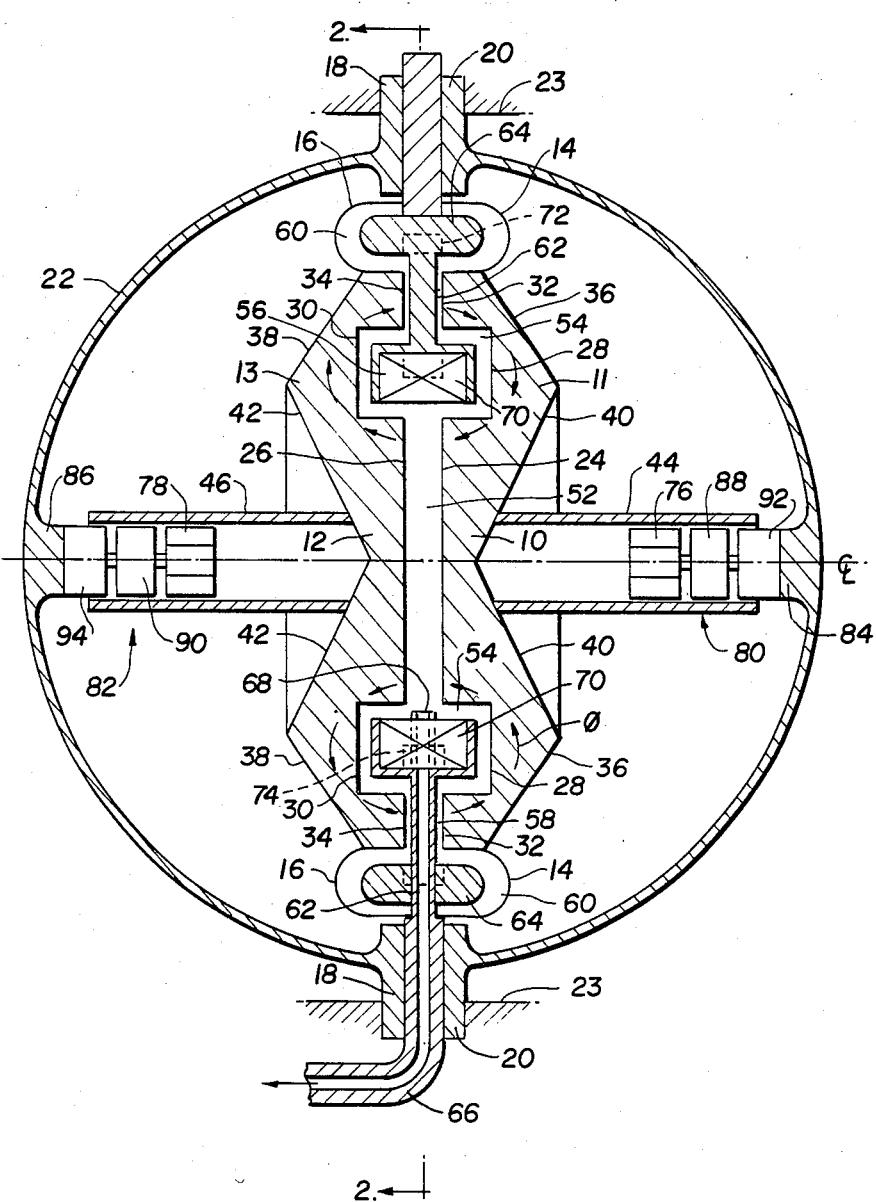
FIG. 1 is a transverse central cross sectional view substantially symmetrical about the horizontal center line, illustrative of a first embodiment of the invention.

Referring now to the drawings and more particularly to FIG. 1, there is illustrated in cross section one embodiment of the invention which is shown comprised of two mutually opposed ferromagnetic, i.e. magnetizable, pistons 10 and 12 which are secured to a pair of flexible diaphragm seals 14 and 16, i.e., mechanical bellows which terminate at two flanges 18 and 20 of a spherical enclosure or housing 22 which is adapted to operate as a pressure shell. Both flanges 18 and 20 are attached to a support structure which is shown schematically at 23. The support structure 23 comprises, for example, a portion of a spacecraft.

Further to the embodiment of the invention shown in FIG. 1, the pistons 10 and 12 have a generally circular perimeter and a cross section which is partially defined by respective lower faces 24 and 26 and which include annular recesses 28 and 30 and outer surfaces 32 and 34 terminating at the diaphragm seals 14 and 16. The outer surfaces of the pistons 10 and 12 define the remainder of the cross section and include outwardly sloped surfaces 36 and 38 which are joined to inwardly sloped surfaces 40 and 42 and thereby provide enlarged regions of ferromagnetic material at the location of the annular recesses 28 and 30. A pair of metallized generally cylindrical tubes 44 and 46 are respectively secured to the outer surfaces 40 and 42 at the midsection of the pistons 10 and 12 and are adapted to operate in conjunction with respective radial and axial capacitive sensor assemblies for controlling axial piston stroke and radial orientation, to be subsequently described.

Figure 2:
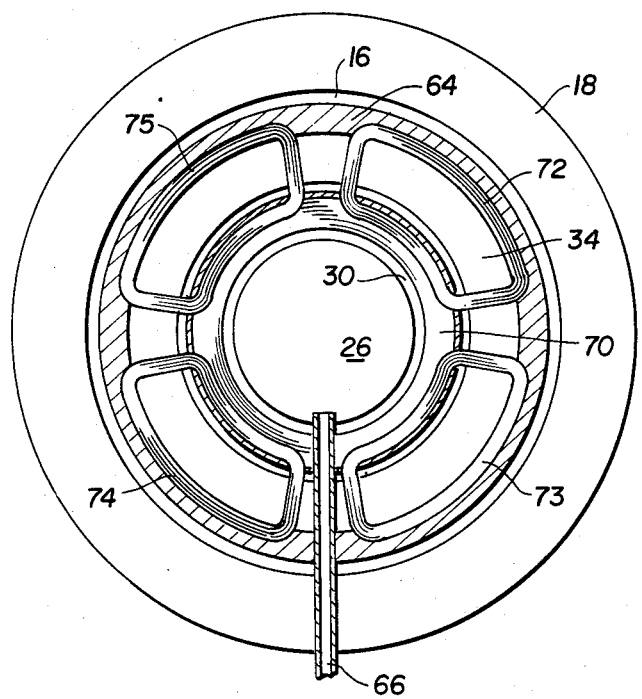
FIG. 2 is a cross sectional view taken along the lines 2—2 of FIG. 1 and being generally illustrative of the electromagnetic coil assembly for operating the embodiment shown in FIG. 1.

The space between the pistons 10 and 12 and the diaphragm seals 14 and 16 is adapted to confine a working fluid such as a gas, consisting of helium, neon, hydrogen, or a combination thereof, under pressure and includes a central volume region 52 connected to an inner annular volume region 54 which is adapted to accommodate an annular electromagnetic coil assembly 56 shown in detail in FIG. 2 as well as a relatively shorter outer channel region 58 which connects to an outer annular region 60 bounded by the bellows type seals 14 and 16. The structure thus described forms a compression volume of gas under pressure which urges the pistons 10 and 12 apart.

The coil assembly 56 is held in place by a support member 62 which includes an enlarged annular portion 64 located in the outer annular region 60 to act as an element for partially filling a portion of the region 60. The pressurized volume of gas in the volume region 52 is adapted to increase in pressure upon the movement of the two pistons 10 and 12 toward one another while a decrease in pressure will occur for a movement in the reverse direction. This change in pressure, $\pm P$ is coupled exteriorly, i.e. vented out of the enclosure 22 by means of a connecting pipe 66 which has its inner end portion 68 extending through the coil assembly 56 and terminating in the inner annular space 54.

Turning attention now to the coil assembly 56 as shown in FIG. 2, it is comprised of an inner annular drive coil 70 and four segmented outer quadrant coils 72, 73, 74, and 75 which are adapted to span each of the four quadrants surrounding the coil 70.

In operation, energization of the drive coil 70 causes a magnetic flux ($\phi$) to be linked through the enlarged portions 11 and 13 of the pistons 10 and 12 as shown by the arrows in FIG. 1 which causes the pistons to be attracted to one another and which has the effect of increasing the pressure of the gas within the space 52 due to the compression of the gas volume between the pistons. The mass of the pistons 10 and 12 together with the working fluid form a naturally resonant gas spring structure which can be tuned or adjusted by proper selection of system parameters. The adjustment can be provided by typical conventional techniques such as varying the amount of gas employed or changing the length, stiffness or thickness of the walls of diaphragm seals 14 and 16. Accordingly, by periodically energizing the drive coil 70, equal and opposite oscillation motions of the masses of the pistons 10 and 12 result, causing a compression wave to be generated in the gas volume and coupled to the vent pipe 66 while substantially eliminating all mechanical vibration produced by the moving parts. Furthermore, electromagnetic energization of the drive coil 70 is accomplished without any direct reaction on the support structure 23 which, as noted previously, may be a spacecraft where vibration must be held to a minimum due to the extremely sensitive equipment carried thereby.

Figure 4:
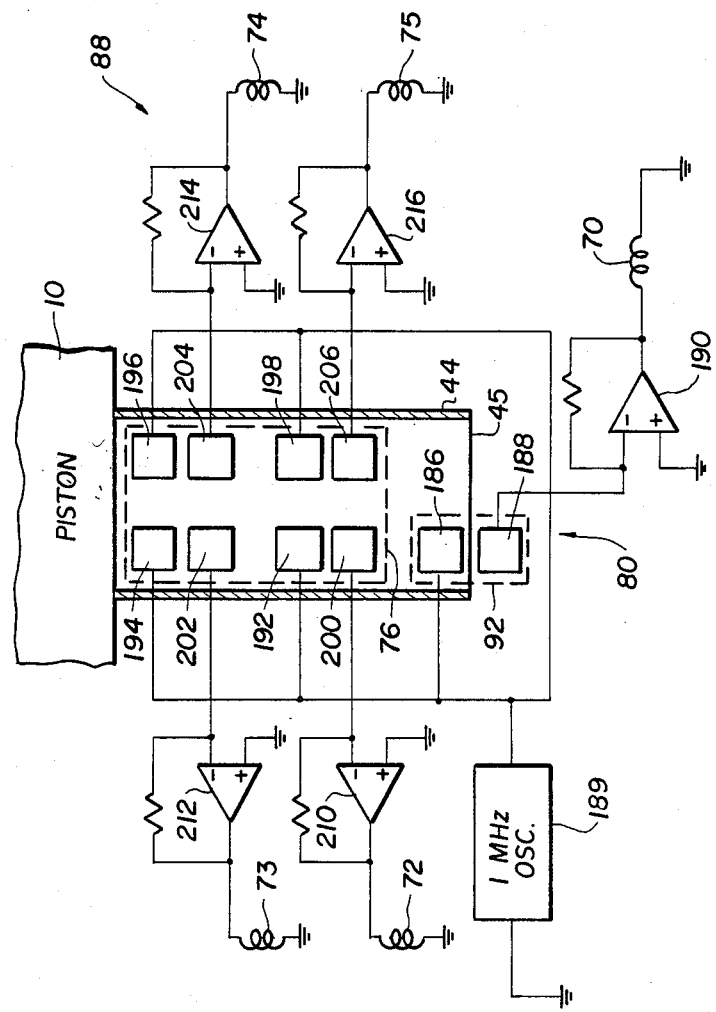
FIG. 4 is an electrical schematic diagram illustrative of the electrical circuitry for energizing the coil assembly shown in FIG. 2.

The quadrant coils 72, 73, 74, and 75 are operated in pairs, one pair 72 and 74, for example, serving to enhance the flux produced by the annular drive coil 70 and the other pair 73 and 75 serving to partially cancel the effect of the flux produced by coil 70. The result is to produce controllable torques on pistons 10 and 12. The current in the quadrant coils is regulated by radial displacement sensors 76 and 78 comprised of capacitor type detector plate configurations respectively located in a pair of sensor assemblies 80 and 82 to maintain the piston faces 24 and 26 parallel. The sensor assemblies 80 and 82, moreover, are mounted on the raised inner wall portions 84 and 86 of the spherical enclosure 22 and respectively extend into the metallized tubes 44 and 46 and are energized by electrical circuitry 88 and 90, the details of which are shown in FIG. 4. For controlling the compressor stroke, i.e. the inward axial motion of the pistons 10 and 12, the sensor assemblies 80 and 82 additionally include an axial displacement sensor set 92 and 94 also comprised of a capacitor type detector plate configuration energized by the electrical circuitry 88 and 90. Thus the axial sensors 92 and 94 are operable to capacitively sense the end of the respective tubes 44 and 46 and suitably energize the piston drive coil 70 while the radial sensor set 76 and 78 is operable to capacitively sense, in four separate quadrants, the relative position of the inner wall surface of the tubes 44 and 46 for selectively energizing the quadrature coils 72, 73, 74 and 75 in order to produce a variable compensating magnetic field for maintaining the inner faces 24 and 26 of the pistons 10 and 12 mutually parallel.

Basically what the embodiment in FIG. 1 is intended to illustrate is the use of magnetically coupled dual pistons of identical shape for eliminating motor reactions on the support structure and being suspended by means of a diaphragm seal or mechanical bellows within a pressurized spherical enclosure.

Figure 3:
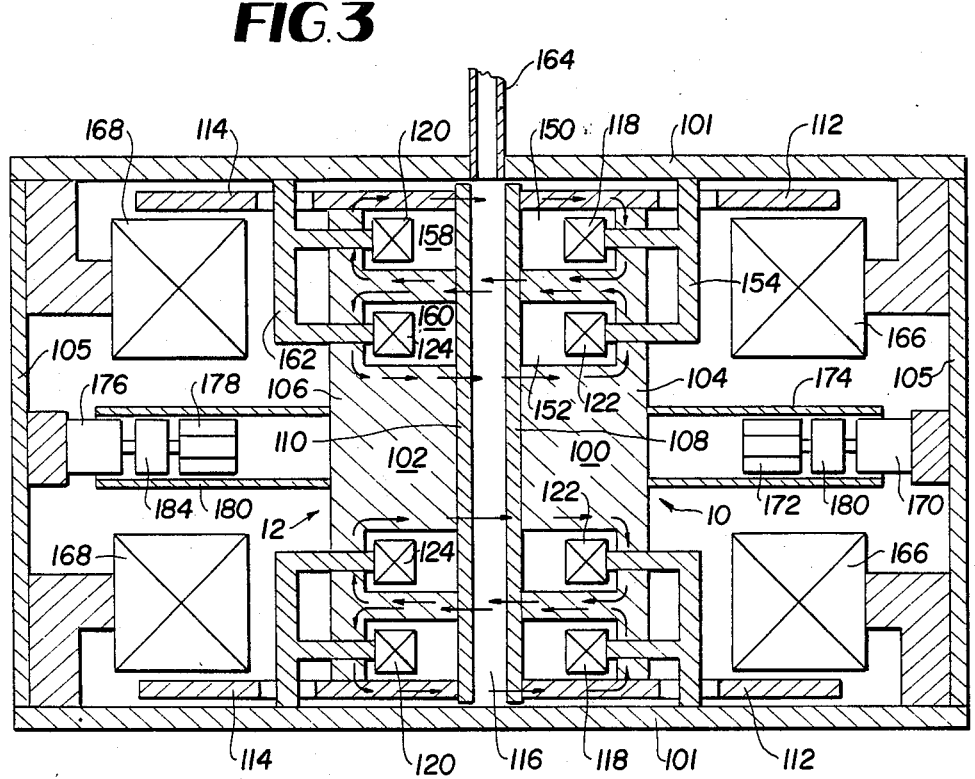
FIG. 3 is a transverse central cross sectional view of a second embodiment of the invention.

Referring now to FIG. 3, there is shown a second embodiment of the invention, but one including opposing dual pistons and seals of a different and simpler construction which are electromagnetically coupled and energized by split coil assemblies on either side of the working fluid space so that an unobstructed space for the active gas volume is provided. More particularly, the structure shown in the central cross sectional view of FIG. 3 is comprised of a pair of identical flat faced circular pistons 100 and 102 located within the cylindrical side wall 101 of the metal housing 103. The pistons respectively comprise ferromagnetic body portions 104 and 106, face plates 108 and 110, as well as outwardly extending cylindrical side elements 112 and 114. As can be seen in FIG. 3, the gas volume space 116 between the face plates 108 and 110 of the pistons 100 and 102 is unobstructed by the electromagnetic coil assembly 56 of the embodiment shown in FIG. 1. In order to provide such a configuration, the embodiment of FIG. 3 splits the previously shown drive coil assembly 56 into two identical annular drive coil assemblies comprised of opposing outer coils 118 and 120 and opposing inner coils 122 and 124.

The coils 118 and 122 are respectively located within slots 150 and 152 formed in the piston body portion 104. Furthermore, the coil assemblies 118 and 122 are held stationary with respect to movement of the piston 100 by being mounted on a bifurcated support structure 154 which is secured to the inside of the enclosure side wall 101. In a like manner, the coils 120 and 124 are located in annular slots 158 and 160 formed in the body portion 106 of the piston 102 and are mounted on a bifurcated support structure 162 secured to the enclosure wall 101. When desirable, other additional opposing drive coils, not shown, can be utilized.

In operation, energization of the four annular drive coils 118, 120 and 122, 124 will develop a magnetic flux interlinking the two pistons 100 and 102, causing them to be mutually attracted to one another and effecting a pressure increase of the working fluid within the space 116. In absence of the magnetic drive field, the pistons 100 and 102 will be pushed apart by the pressurized gas. As in the earlier embodiment, the design is such that a resonant condition exists which causes an oscillating compression wave to be produced and which is coupled out of the compressor via the vent pipe 164.

In order to provide for radial compensation and to provide a fluid seal while eliminating friction against the enclosure side wall 101, the pistons 100 and 102 are supported and form non-contacting clearance seals within the enclosures 103 by means of respective magnetic bearing assemblies which are formed by means of the cylindrical side elements 112 and 114 of the pistons 100 and 102 magnetically coupled to the flux generated by the respective annular winding assemblies 166 and 168. These windings, moreover, replace the windings 72, 73, 74 and 75 of FIG. 2 but are energized in substantially the same manner. The windings 166 and 168 are shown in FIG. 3 located interiorally adjacent the outer end portions of the side elements 112 and 114 behind the coil supports 154 and 162. When desirable, the non-contacting clearance seals can be implemented in other ways such as by the use of flat, spiral, radially stiff springs between the pistons 100 and 102 and the enclosure side wall 101. Also, when desirable, diaphragm or bellows type seals can be utilized.

The embodiment shown in FIG. 3 also includes respective axial and radial sensors for controlling the stroke and radial orientation of the pistons 100 and 102. With respect to the piston 100, it includes a capacitive sensor assembly 170 for sensing the axial or stroke motion of the piston and a capacitive assembly 172 to sense the radial displacement in relation to a metallized tube 174 in the same manner as was disclosed in FIG. 1. With respect to the opposite piston 102, it includes its own capacitive sensor 176 for sensing the axial or stroke displacement of the piston 102 as well as a separate capacitive radial sensor 178, both of which operate in response to the position of the metallized tube 180. Both sensor assemblies are secured to the end walls 105 of the housing 103 and are energized by suitable electrical drive circuitry 182 and 184.

Referring now to FIG. 4, there is disclosed an electrical schematic diagram illustrative of electrical circuitry 88 for controlling the generation of drive and compensating magnetic fields in response to the sensor assembly 80 of the embodiment shown in FIG. 1 and including the sensors 76 and 92 bearing in mind that the same identical circuit configuration obtains for the other sensors 78 and 94 of assembly 82. As shown, the axial sensor 92 is comprised of two closely positioned capacitive plates 186 and 188, with plate 186 being coupled to a 1 MHz oscillator 189. The signal from the oscillator 189 is capacitively coupled to an operational amplifier 190 via the plate 188. The capacitive reactance of the plate 188, however, is affected by the relative position of the end 45 of the metallized tube 44 and is set such that a predetermined change in the capacitive reactance causes the operational amplifier 190 to output a signal which is operable to energize the axial drive coil 70 of FIG. 2.

The radial sensor 76 is similar to the axial sensor 92 with the exception that it includes four separate pairs of capacitive plates which are respectively responsive to the proximity of the wall of the surrounding tube 44. As shown, the oscillator 189 is commonly coupled to the plates 192, 194, 196 and 198 which are respectively associated with closely adjoining plates 200, 202, 204 and 206. The plates 200, 202, 204 and 206 are respectively coupled to separate operational amplifiers 210, 212, 214 and 216 which operate in response to changes in capacitive reactances of the plates to respectively energize the radial drive coils 72, 73, 74 and 75 in any of the four quadrants required to keep the piston 10 properly oriented.

Although not restricted to such use, the oscillating compression wave generated by the embodiments disclosed in FIGS. 1 and 3 can be vented out to a Stirling cycle displacer assembly, not shown, which can develop refrigeration by properly controlled motion when phased properly with the varying compression. Such apparatus is taught, for example, in the above mentioned related U.S. Pat. No. 4,389,849.

The mutually attractive forces developed electromagnetically on the mutually opposing identical pistons can be increased in this invention by the presence of a steady state magnetic flux linking the two pistons and can be provided for by a DC bias current, not shown, in the coil 70 of FIG. 2 or coils 118 through 124 of FIG. 3 or by means of permanent magnets contained in the ferrous structure of the pistons themselves. This is because the force is the function of the square of flux density and a modulation superimposed on a constant level enhances the effectiveness. A differential pressure to preserve the nominal centered position of each piston would be required, however. It is also significant to note that the piston assemblies in both embodiments disclosed in FIGS. 1 and 3 provide a relatively large working area relative to the volume of the working fluid and accordingly, only a relatively short stroke is required for a given volumetric displacement.

Since the Stirling cycle is also suitable for engines as well as refrigerators, identical hardware can be utilized in either mode. Where, for example, an engine mode is required, a forced oscillation motion of the piston would result in a corresponding AC voltage being generated in the coils and the subject apparatus would then act as a power source.

The advantage realized in the structural features set forth with respect to the embodiments disclosed, lies in the ability to produce an inherently momentum compensated operation with minimal life limiting wear and no lubrication requirements. When used with a similarly constructed displacer unit for implementing a Stirling cycle cooler, the entire apparatus can be hermetically sealed allowing the use of any desired working fluid.

Whereas the invention has been shown and described with respect to the preferred embodiments, it should be understood that modifications may be made and equivalents substituted without departing from the spirit and scope of the invention. Accordingly, all modifications, changes and alterations coming within the spirit and scope of the invention as defined in the appended claims are herein meant to be included.

We claim:

1. Fluid compressor apparatus substantially free of mechanical vibrations, comprising in combination:
   a pair of mutually opposing movable magnetizable bodies (10, 12) located in a body housing (22),
   a sealed volume of a working fluid under pressure located between said pair of bodies (10, 12) which urges said bodies apart;
   means (56) in relatively close proximity to said pair of magnetizable bodies (10, 12) for periodically generating a single magnetic field interlinking said bodies, said single magnetic field passing through said magnetizable bodies and producing mutually attractive magnetic forces therebetween for causing said bodies to be drawn together, whereupon said volume alternately compresses and expands to respectively increase and decrease the pressure of the working fluid to generate a compression wave therein; and
   outlet means (66) for coupling said compression wave generated in the gas volume out of the body housing (22), said outlet means being located intermediate said magnetizable bodies.

2. The fluid compressor apparatus as defined by claim 1 wherein said pair of magnetizable bodies (10, 12) comprises a pair of substantially identical ferromagnetic bodies.

3. The fluid compressor apparatus as defined by claim 1 wherein said working fluid comprises a gas and wherein said pair of magnetizable bodies (10, 12) are comprised of substantially identical ferromagnetic piston assemblies having substantially the same mass which operates in conjunction with said gas to provide a resonant spring structure having a predetermined natural resonance and which is set into operation by said periodically generated magnetic field to generate an oscillating compression wave.

4. The fluid compressor apparatus as defined by claim 3 wherein said generating means (56) comprises annular drive coil means (70).

5. The fluid compressor apparatus as defined by claim 4 wherein said annular drive coil means (70) comprises at least one annular coil located intermediate said piston assemblies.

6. Fluid compressor apparatus substantially free of mechanical vibrations, comprising:
a pair of mutually opposing movable magnetizable bodies (10, 12) located in a body housing (22);
a sealed volume of a gas working fluid under pressure located between said pair of bodies (10, 12) which urges said bodies apart;
said bodies (10, 12) comprised of substantially identical ferromagnetic piston assemblies having substantially the same mass which operates in conjunction with said gas to provide a resonant spring structure having a predetermined natural resonance and which is set into operation by a periodically generated magnetic field to generate an oscillating compression wave; and
annular drive coil means (70) comprising at least one annular coil located in the gas volume between and intermediate said piston assemblies (10, 12) in relative close proximity thereto for periodically generating a magnetic field interlinking said assemblies and producing mutually attractive magnetic forces therebetween for causing said assemblies to be drawn together, whereupon said volume alternately compresses and expands to respectively increase and decrease the pressure of the working fluid to generate a compression wave therein.

7. The fluid compressor apparatus as defined by claim 6 and additionally including outlet means (66) for coupling said compression wave generated in the gas volume out of the body housing (22).

8. The fluid compressor apparatus as defined by claim 6 wherein said spring structure additionally includes flexible diaphragm seal means (14, 16) located intermediate said pair of piston assemblies (10, 12) and the body housing (22), said sealed volume being defined by the space (52, 54, 60) between said pair of piston assemblies (10, 12) and said flexible diaphragm seal means (14, 16).

9. The fluid compressor apparatus as defined by claim 6 and additionally including sensor means (92, 94) for sensing the axial movement of said pistons (10, 12) and energizing said magnetic field generating means in response to a predetermined sensed axial separation of said piston assemblies.

10. The fluid compressor apparatus as defined by claim 9 wherein said magnetic field generating means (56) additionally includes means (72, 73, 74, 75) for generating a compensating magnetic field for maintaining the radial and angular orientation of said piston assemblies (10, 12) constant.

11. The fluid compressor apparatus as defined by claim 10 and additionally including sensing means (76, 78) for sensing the radial orientation of said piston assemblies (10, 12) and energizing said compensating magnetic field generating means which operates to keep the faces of said pistons mutually parallel with one another.

12. The fluid compressor apparatus as defined by claim 11 wherein said compensating magnetic field generating means (72, 73, 74, 75) comprises coil means for generating quadrature magnetic fields in said piston assemblies.

13. The fluid compressor apparatus as defined by claim 12 wherein said coil means (72, 73, 74, 75) are located in close proximity to said annular drive coil means (70).

14. The fluid compressor apparatus as defined by claim 6 wherein said predetermined natural resonance is adjustable.

* * * * *